(12) United States Patent
Cox et al.

(10) Patent No.: US 10,603,593 B2
(45) Date of Patent: Mar. 31, 2020

(54) AUTOMATICALLY REDUCING USE OF CHEAT SOFTWARE IN AN ONLINE GAME ENVIRONMENT

(71) Applicant: Valve Corporation, Bellevue, WA (US)

(72) Inventors: Anthony John Cox, Seattle, WA (US); John McDonald, Seattle, WA (US); Gabe Van Engel, Seattle, WA (US); Matt Rhoten, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 69 days.

(21) Appl. No.: 15/927,989

(22) Filed: Mar. 21, 2018

(65) Prior Publication Data
US 2019/0291008 A1 Sep. 26, 2019

(51) Int. Cl.
*A63F 13/79* (2014.01)
*A63F 13/75* (2014.01)
(Continued)

(52) U.S. Cl.
CPC ............ *A63F 13/75* (2014.09); *A63F 13/335* (2014.09); *A63F 13/352* (2014.09); *A63F 13/40* (2014.09);
(Continued)

(58) Field of Classification Search
CPC .......... A63F 13/75; A63F 13/71; A63F 13/73; A63F 13/79; G06F 21/50; G06N 3/08; G06N 3/063; G06N 3/02
(Continued)

(56) References Cited

U.S. PATENT DOCUMENTS 7,169,050 B1 * 1/2007 Tyler ..................... A63F 13/12
463/42
9,504,916 B2 * 11/2016 Zhao ..................... G06F 21/645
(Continued)

OTHER PUBLICATIONS

Alayed, H., et al., "Behavioral-Based Cheating Detection in Online First Person Shooters using Machine Learning Techniques," 2013 IEEE Conference on Computational Intelligence in Games (CIG), Aug. 2013, 8 pages.
(Continued)

*Primary Examiner* — Omkar A Deodhar
*Assistant Examiner* — Shauna-Kay Hall
(74) *Attorney, Agent, or Firm* — Seed Intellectual Property Law Group LLP

(57) ABSTRACT

Techniques are described for automatically reducing cheating in an interactive execution environment, such as to perform automated operations to detect and stop use of cheat software in an online game environment, and to restrict subsequent access to the online game environment for users who are identified as using cheat software. The techniques may include using deep learning techniques to train one or more models to classify particular types of gameplay actions as being unauthorized if cheat software use is detected, including to determine a likelihood of whether a separate cheat detection decision system would decide that particular gameplay actions are authorized or not authorized if the additional cheat detection decision system assesses those gameplay actions, and then using the trained model(s) and in some cases the additional cheat detection decision system for the cheat software detection and prevention.

19 Claims, 6 Drawing Sheets

(51) Int. Cl.
*A63F 13/40* (2014.01)
*A63F 13/335* (2014.01)
*G06N 3/08* (2006.01)
*G06N 3/04* (2006.01)
*A63F 13/352* (2014.01)
*A63F 13/837* (2014.01)

(52) U.S. Cl.
CPC .............. *A63F 13/79* (2014.09); *G06N 3/04* (2013.01); *G06N 3/08* (2013.01); *A63F 13/837* (2014.09)

(58) Field of Classification Search
USPC ........................................................ 463/29
See application file for complete search history.

(56) References Cited

U.S. PATENT DOCUMENTS

| | | | | |
|---|---|---|---|---|
| 2007/0232398 A1* | 10/2007 | Aikin | .................. | G06Q 40/025 463/42 |
| 2007/0238528 A1* | 10/2007 | Harris | .................... | A63F 13/12 463/42 |
| 2008/0004107 A1* | 1/2008 | Nguyen | ................. | G06Q 10/10 463/29 |
| 2008/0305869 A1* | 12/2008 | Konforty | ................ | A63F 13/12 463/29 |
| 2009/0069088 A1* | 3/2009 | Levitt | .................... | G07F 17/32 463/42 |
| 2010/0035694 A1* | 2/2010 | Losica | ................... | G07F 17/32 463/42 |
| 2013/0072306 A1* | 3/2013 | Parnprome | ............. | G06F 21/52 463/42 |
| 2014/0287826 A1* | 9/2014 | Zhao | ..................... | G06F 21/645 463/29 |
| 2015/0254555 A1* | 9/2015 | Williams, Jr. | ....... | G06N 3/0454 706/14 |
| 2017/0294075 A1* | 10/2017 | Frenkel | ................... | G07F 17/32 |

OTHER PUBLICATIONS

Yeung, S.F., et al., "Detecting Cheaters for Multiplayer Games: Theory, Design and Implementation [1]," 2006 3$^{rd}$ IEEE Consumer Communications and Networking Conference, Jan. 2006, 5 pages.

CS:GO Overwatch FAQ, retrieved on Mar. 13, 2018, from http://blog.counter-strike.net/index.php/overwatch/, 4 pages.

Valve_Anti-Cheat comments on ELI5: Why are spinbots not auto-detected or at least kicked for 'improper play,' retrieved on Mar. 13, 2018, from http://reddit.com/r/GlobalOffensive/comments/5u2x1y/eli5_why_are_spinbots_not_autodete . . . , 2 pages.

Valve Anti-Cheat System (VAC), retrieved on Mar. 13, 2018, from https://support.steampowered.com/kb_article.php?ref=7849-Radz-6869, 3 pages.

Wikipedia, Valve Anti-Cheat, retrieved on Mar. 13, 2018, from https://en.wikipedia.org/wiki/Valve_Anti-Cheat, 6 pages.

International Search Report and Written Opinion dated May 23, 2019, for International Application No. PCT/US19/22298, 17 pages.

Weisz, "Detecting Cheaters in a Distributed Multiplayer Game," School of Computer Science Carnegie Mellon University, 2003. (28 pages) https://pdfs.semanticscholar.org/6d25/ae454be416e1d3e0f1cd23bafbe8b9542857.pdf?_ga=2.262785100.192760153.1566409144-1073210062.1566409144.

\* cited by examiner

AUTOMATICALLY REDUCING USE OF CHEAT SOFTWARE IN AN ONLINE GAME ENVIRONMENT

TECHNICAL FIELD

The following disclosure relates generally to techniques for automatically reducing cheating in an interactive execution environment, and more specifically to techniques for performing automated operations to use deep learning classification to detect and stop use of cheat software in an online game environment or other interactive execution environment.

BACKGROUND

As use of computer games has proliferated, so have inappropriate activities of some users of such computer games, including attempts to obtain unfair advantages by cheating. Examples of such cheating include exploiting known bugs in game software, using software programs (sometimes referred to as "bots") to take automated actions on behalf of users, and using software programs to modify data and/or functionality within the game (e.g., to provide enhanced capabilities, to change user scores or other associated data, etc.).

Various techniques have been tried to prevent cheating within games, but such techniques all suffer from problems. For example, in situations in which a user is using a client computing device to access functionality provided by one or more remote game server computing systems, techniques have been used to monitor the client computing device's setup (e.g., programs being executed) in an attempt to identify known cheat-related setup configurations, but users may attempt to hide such setup configurations on their client computing devices in various ways, and such techniques are limited to only those setup configurations that are known in advance of their use.

Accordingly, it would be beneficial to implement improved techniques for automatically reducing cheating in online game environments or other interactive execution environments.

DETAILED DESCRIPTION

Figure 1:
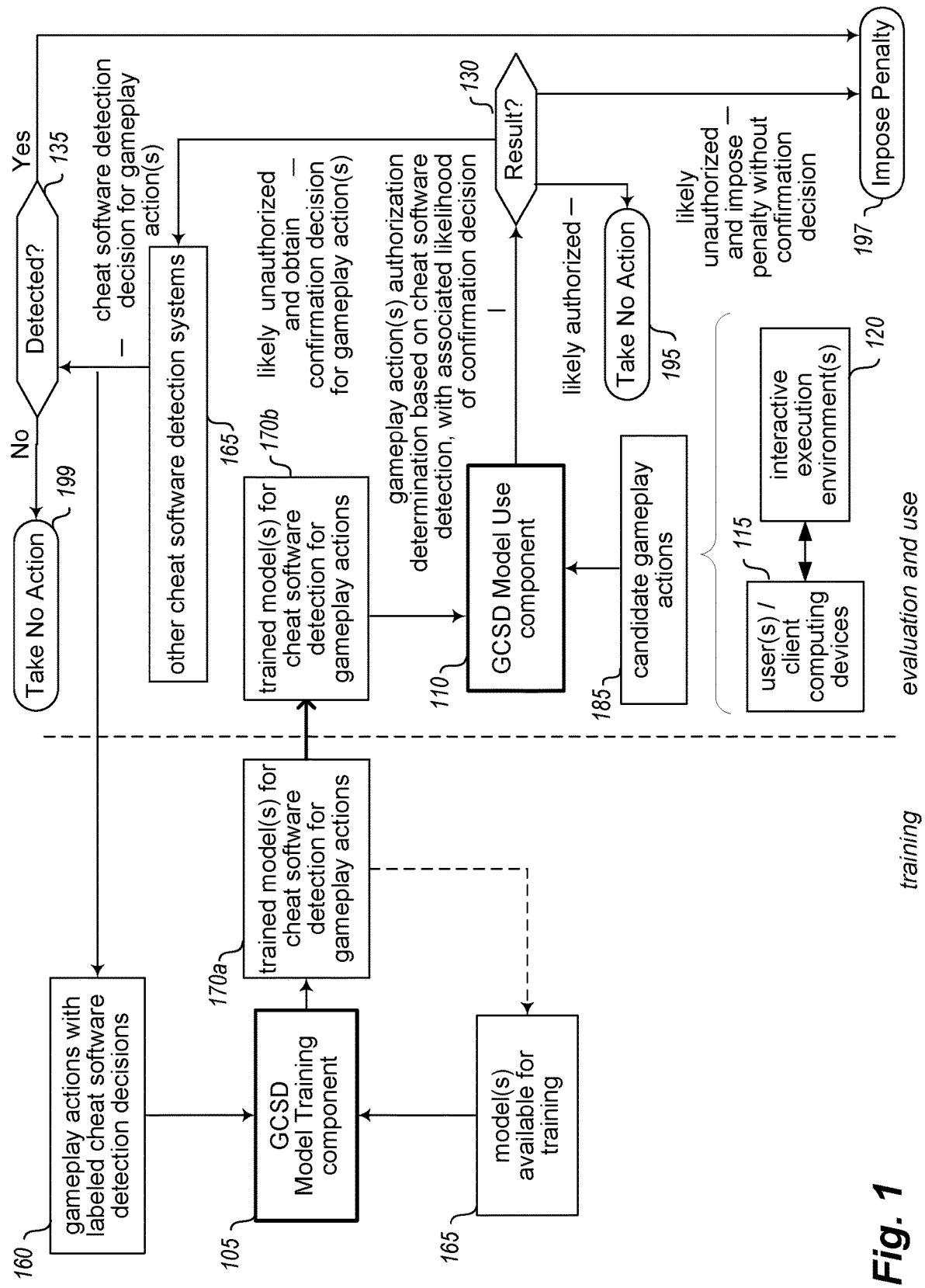
FIG. 1 is a diagram of an environment that includes one or more systems suitable for performing at least some techniques described in the present disclosure, including embodiments of a Game Cheat Software Detection ("GCSD") system.

The present disclosure relates generally to techniques for automatically reducing cheating in an online game environment (or other interactive execution environment), such as to perform automated operations to detect and stop use of cheat software in the online game environment and to restrict subsequent access to the online game environment for users who are identified as using cheat software. In at least some such embodiments, the techniques may include using deep learning techniques to train one or more models to classify particular types of actions in an online game environment (referred to generally herein as "gameplay actions") as being unauthorized if cheat software use is detected, including to determine a likelihood of whether a separate cheat software detection decision system would decide that particular gameplay actions involve cheat software use if the additional cheat software detection decision system assesses the particular gameplay actions. Such an online game environment (or other interactive execution environment) may, for example, be provided by one or more server computing systems, with one or more users using client computing devices to access the online game environment over one or more computer networks—in at least some such embodiments, the online game environment may be simultaneously shared by multiple users, and the automated cheat software detection techniques may be used to restrict the ability of users to use unauthorized cheat software to influence the functionality of the online game environment (e.g., to prevent particular users from intentionally performing unauthorized activities to gain an unfair advantage relative to other users, such as to ban or otherwise penalize users found to have used unauthorized cheat software). Some or all of the techniques described herein may be performed in at least some embodiments via automated operations of a Game Cheat Software Detection ("GCSD") system, as discussed in greater detail below.

In at least some embodiments, the techniques further include, as part of automatically detecting cheat software use in an online game environment, enforcing penalties on particular users related to such cheat software use in the online game environment. For example, if the described techniques automatically determine that a particular user is likely to have participated (or attempted to participate) in one or more unauthorized gameplay actions involving cheat software use, the techniques may further include automatically imposing one or more penalties on the user in some embodiments as a result of that determination, while in other embodiments the techniques may instead initiate the potential imposition of such penalties as a result of that determination by referring the gameplay action(s) for further assessment and/or confirmation by one or more other cheat software detection decision systems that decide whether the gameplay action(s) warrant a penalty or not. The types of penalties may vary in at least some embodiments, such as based on one or more of the following: a type of unauthorized gameplay action, an effect of the unauthorized gameplay action, a likelihood that the gameplay action was unauthorized, a history of one or more previous unauthorized gameplay actions on behalf of the user, etc. Non-exclusive examples of types of penalties may include one or more of the following: a permanent ban of the user from using the online game environment or particular types of functionality in the online game environment; a temporary ban or suspension of the user from using the online game environment or particular types of functionality in the online game environment, such as for a defined period of time and/or until one or more other specified criteria are satisfied; an increase in a number of points or other tracked accumulation representing unauthorized gameplay action on behalf of the user, such that reaching one or more upper threshold levels of such tracked accumulation of unauthorized gameplay action may cause one or more penalties to be assessed;

a decrease in assessed trust of the user or other assessed score for the user (e.g., an experience or success score), such that reaching one or more lower threshold levels of such assessed trust or other score may cause one or more penalties to be assessed; etc. Additional details are included below related to imposing penalties on users for participating in unauthorized gameplay actions.

In addition, one or more models may be trained and used in various manners in various embodiments as part of performance of the described techniques, including to use deep learning techniques to train a model (e.g., a deep neural network model) in at least some such embodiments. In particular, training data may be gathered that includes examples of gameplay actions and whether or not those gameplay actions are labeled or otherwise classified as being unauthorized or not due to use of cheat software or not, and such training data may be used to train a model to recognize other similar gameplay actions as being authorized or not, optionally with associated weights (e.g., a likelihood that a similar gameplay action is authorized or not)—such training data may include values for various attributes associated with the gameplay actions, as discussed in greater detail below. In addition, one or more other cheat software detection decision systems may be available in at least some embodiments to assess at least some gameplay actions and make decisions about whether those gameplay actions are unauthorized or not due to use of cheat software or not—if so, previous decisions about particular gameplay actions by the other cheat software detection decision system(s) may provide some or all of the training data. When a trained model is used to analyze current gameplay actions and such other cheat software detection decision system(s) are available, a determination by the trained model(s) that a particular gameplay action is not authorized due to use of cheat software may initiate a referral of that gameplay action to the other cheat software detection decision system(s) for a further assessment of that gameplay action and resulting decision on whether or not that gameplay action is unauthorized or not due to use of cheat software or not—if so, the training of the model (and the labeling or classification of particular gameplay actions in the training data as being authorized or not) may further represent the likelihood that the other cheat software detection decision system(s) would decide that such gameplay actions are authorized or not if they assessed them, and the resulting trained model may determine that a particular gameplay action is not authorized if its assessed likelihood that the other cheat software detection decision system(s) would decide the gameplay action is not authorized due to use of cheat software exceeds a defined threshold (e.g., 55%). Such other cheat software detection decision systems may include, for example, another automated system, a system-directed review by one or more humans (e.g., by other users of the online game environment), etc. Additional details are included below related to training models and using trained models to analyze gameplay actions.

The described techniques may further be used with various types of online game environments or other interactive execution environments in various embodiments, such as any environment in which activities of a user to use unauthorized software to influence or affect use of the interactive execution environment may be tracked (e.g., by a client computing device that the user is using, by one or more server computing systems providing the interactive execution environment, etc.) and in which some types of gameplay actions (or other interaction actions in an interactive execution environment) are not authorized for at least some users. As noted above, one non-exclusive example of such an interactive execution environment is an online game environment in which one or more users perform activities in an attempt to achieve one or more goals (e.g., to outscore or otherwise defeat one or more other users who are competitively participating in the online game environment, whether simultaneously with the one or more users or instead at one or more other times separately from the one or more users), such as during one or more games or otherwise as part of one or more interaction sessions with the online game environment. Another example of such an interactive execution environment is a virtual world or other virtually augmented information accessed by a user using virtual reality ("VR") and/or augmented reality ("AR") techniques and devices (e.g., a head-mounted display device), such as to access information, perform tasks, etc. during one or more interaction sessions with the virtual world or other virtually augmented information—in such situations, virtual reality systems typically envelop a wearer's eyes completely and substitute a "virtual" reality for the actual view (or actual reality) in front of the wearer, while augmented reality systems (sometimes referred to as "mixed reality" or "hybrid reality") typically provide a semi-transparent or transparent overlay of one or more screens in front of a wearer's eyes such that a view of an actual setting (e.g., an actual surrounding environment) is augmented with additional information.

In addition, examples of types of gameplay actions in such online game environments may include, for example, user movements within the environment, user selections or other interactions with virtual objects within the environment, user activations or other uses of virtual tools or other virtual objects within the environment (e.g., drive a vehicle, fire a weapon, etc.), user accessing of additional information within the environment that is not otherwise visible or accessible, user manipulation of input/output ("I/O") devices of a client computing device, etc. In addition, when using information about a particular gameplay action (e.g., to train a model, to assess whether the gameplay action is authorized, etc.), various types of associated information about the gameplay action may be used, such as values for one or more attributes as follows: location and/or movement of the user at one or more times before the gameplay action and/or after the gameplay action (e.g., during a period of time of 0.5 seconds before and a period of time of 0.25 seconds after); location and/or movement of a virtual object by the user at one or more times before the gameplay action and/or after the gameplay action (e.g., during a period of time of 0.5 seconds before and a period of time of 0.25 seconds after); a type of virtual object; a type of selection or other interaction with a virtual object; a type of activation or other use of a virtual object; a result of a user interaction with or use of a virtual object, including information about any other virtual objects that are affected (e.g., a distance to the other virtual object, a type of effect on the other virtual object; etc.); a type of and/or manner of accessing additional information within the environment that is not otherwise visible or accessible; a result of a user accessing such additional information within the environment; a result of a user manipulation of an I/O device of the client computing device; etc. When assessing a user's activities, individual gameplay actions may be separately assessed in some embodiments, while in other embodiments a group of multiple gameplay actions (e.g., of a single type and during a single interaction session or period of time) may be assessed together. Additional details are included below related to online game environments and corresponding gameplay actions.

Benefits of the described techniques in at least some embodiments include improved control of user access to online game environments, including to restrict users from performing unauthorized actions—accordingly, such techniques may improve computer operations, including by, as non-exclusive examples, better protecting restricted information and functionality due to more accurate automated identification of unauthorized gameplay actions (e.g., to more accurately identify unauthorized gameplay actions that are not identical to previously known particular unauthorized gameplay actions, including to identify new types of unauthorized gameplay actions), performing cheat software detection more quickly and/or using less computing resources at evaluation time (since other techniques are less accurate and thus would need more computing resources in an attempt to reduce their accuracy deficiencies with respect to the described techniques), etc.

For illustrative purposes, some embodiments are described below in which specific types of information are acquired and used in specific types of ways for specific types of interactive execution environments and by using specific types of devices—for example, at least some embodiments described below involve use of online game environments and cheat software use detection. However, it will be understood that such described techniques may be used in other manners in other embodiments, including for other types of interactive execution environments and other types of unauthorized software use within those environments, and that the invention is thus not limited to the exemplary details provided. In addition, while some embodiments discuss using trained models based on deep neural networks, other types of models and/or learning techniques may be used in other embodiments, including other types of deep learning techniques and/or other machine learning techniques that do not use deep learning, as well as neural network models that use convolutional layers (whether in addition to or instead of dense and recurrent layers). In addition, various details are provided in the drawings and text for exemplary purposes, but are not intended to limit the scope of the invention.

FIG. 1 is a diagram of an environment that includes one or more systems suitable for performing at least some techniques described in the present disclosure, including embodiments of the Game Cheat Software Detection ("GCSD") system. In particular, FIG. 1 includes elements 105, 160, 165 and 170a that are used to perform training activities (as controlled by automated operations of GCSD Model Training component 105), resulting in one or more trained models 170b that are used in subsequent evaluation activities to assess authorization of particular candidate gameplay actions based on whether cheat software use is detected (as controlled by automated operations of GCSD Model Use component 110).

As part of the training activities, the GCSD Model Training component 105 obtains training data 160 that includes gameplay actions with labeled cheat software detection decisions, and uses the training data to train one or more models 165 (whether new models or previously trained models) and produce one or more models 170a that are trained for subsequent use in determining authorization of gameplay actions based on cheat software use detection. As discussed elsewhere, the model(s) 170a may each be trained to assess one or more types of gameplay actions for one or more execution environments, including to provide an associated likelihood that a group of one or more gameplay actions is unauthorized due to cheat software use (e.g., based on an assessment that one or more other cheat software detection decision systems, such as systems 165, will decide that those gameplay actions involve cheat software use if those gameplay actions are assessed). Furthermore, in at least some embodiments, deep learning techniques may be used for the training, such as with respect to one or more deep neural networks used for the model(s), with FIGS. 2A and 2B providing further illustrative examples related to such training and models.

The trained model(s) 170a are then made available for use in subsequent activities to implement cheat software use detection and prevention in one or more execution environments (e.g., by users 115 of client computing devices interacting with online game environments 120), such as for the GCSD Model Use component 110 to use one or more of the trained model(s) 170a as models 170b during the implementation activities, including to ban users from use of online game environment(s) 120 or otherwise penalize the users if they are identified as having participated in one or more unauthorized activities involving use of cheat software. In particular, users 115 interact with one or online game environments 120 (e.g., a shared simultaneous online game environment), performing various activities during interaction sessions, and producing candidate gameplay actions 185 to be assessed as potentially involving use of cheat software. In some embodiments, every activity of every user resulting in a gameplay action of one or more defined types is considered as a candidate gameplay action to be assessed, while in other embodiments gameplay actions may be selected as candidate gameplay actions in other manners, such as one or more of the following: random sampling; by eliminating or reducing a likelihood of assessing gameplay actions for a user as the user's trust score increases; by always selecting or increasing a likelihood of assessing gameplay actions for a user as the user's penalty score or other penalty accumulation increases; by the user or the user's gameplay actions being nominated by a human (e.g., by one or more other users of the interactive execution environment, such as users simultaneously participating in the interactive execution environment; by one or more human representatives of an operator of the interactive execution environment and/or of the GCSD system; etc.); by the user or the user's gameplay actions being nominated by another system (e.g., by a monitoring system, such as software executing on a user's client computing device to look for evidence of unauthorized cheat software or other software being executed within memory of the client computing device); etc.

When the candidate unauthorized gameplay actions 185 are available, the component 110 supplies them as input to one or more trained models 170b, obtaining an authorization determination for each group of one or more gameplay actions based on whether they involve use of cheat software, with an associated likelihood for the authorization determination—as discussed elsewhere, in at least some embodiments the likelihood represents the likelihood that those gameplay actions, if assessed by one or more other cheat software detection decision systems such as systems 165, would result in a decision that those gameplay actions are unauthorized. In the illustrated embodiment, the authorization determination for each group of gameplay actions results 130 in one or more subsequent activities, including to take no further action 195 if the authorization determination indicates that the gameplay action(s) are sufficiently likely to be authorized (e.g., with the likelihood of being unauthorized being below a defined threshold). In some embodiments, authorization determinations that gameplay action(s) are sufficiently likely to be unauthorized are referred to the one or more other cheat software detection decision systems 165 for their confirmation and decision as to whether those gameplay action(s) are to be treated as being unauthorized— in the illustrated embodiment, however, at least some authorization determinations may result in the component 110 directly imposing a penalty 197 on the user. As one example, if the likelihood of the action(s) being unauthorized exceeds an upper threshold (e.g., 80% or 90% or 95% or 98% or 99%), the component 110 may proceed to directly impose penalties 197, while if the likelihood exceeds a lower threshold (e.g., 50% or 55% or 60%), the component 110 may proceed to refer the unauthorized assessment for confirmation by other cheat software detection decision system(s) 165. In some embodiments, some or all such likelihood thresholds may be configurable and/or automatically learned, and other thresholds (e.g., related to previous unauthorization activities and/or penalties, related to trust level, etc.) may similarly be configurable and/or automatically learned. In addition, in other embodiments when the activities proceed from block 130 to directly impose a penalty in block 197, the activities may nonetheless also refer the gameplay action(s) to the other cheat software detection systems for a resulting decision, with the initially imposed penalty being removed if the resulting decision finds that cheat software use is not detected.

If the gameplay action(s) and the likely determination of unauthorization are referred to the one or more other cheat software detection decision systems 165, the other cheat software detection decision systems may generate a resulting decision of whether the action(s) are unauthorized or not based on cheat software use being detected or not—if it is determined in block 135 that cheat software use is detected, the flow continues to impose the penalties 197, while otherwise the flow proceeds to 199 to take no further action (or to rescind an initial penalty that was directly imposed pending the decision, as noted above). In addition, in at least some embodiments, the cheat software use detection decisions from the other cheat software detection decision system(s), whether use is detected or not, may be subsequently used as additional training data 160, including in some embodiments to obtain all such training data 160 from previous decisions by the other cheat software detection decision system(s) for actual gameplay actions in one or more execution environments. Such other cheat software detection decision systems 165 may include, for example, another automated system, a system-directed review by one or more humans (e.g., by other users of the same online game environment in which the gameplay actions took place), etc. In addition, in at least some embodiments, the type of one or more penalties that are imposed (whether directly by the GCSD Model Use component or by the other cheat software detection decision system(s) 165) may vary with one or more factors, including the associated likelihood (e.g., to impose a first penalty type if the likelihood exceeds the upper threshold, and to impose a second penalty type, whether instead of or in addition to the first penalty type, if the likelihood exceeds another threshold, such as higher than the upper threshold), other information about the user (e.g., a trust score for the user, previous actions of the user, accumulated penalty points or other similar penalty accumulation, an amount of time since a previous penalty, etc.).

Thus, in this manner the GCSD system may perform automated operations to automatically reduce cheating in an online game environment, including to use deep learning classification techniques in at least some embodiments to implement such cheat software detection for functionality provided in such an online game environment.

Figure 2A:
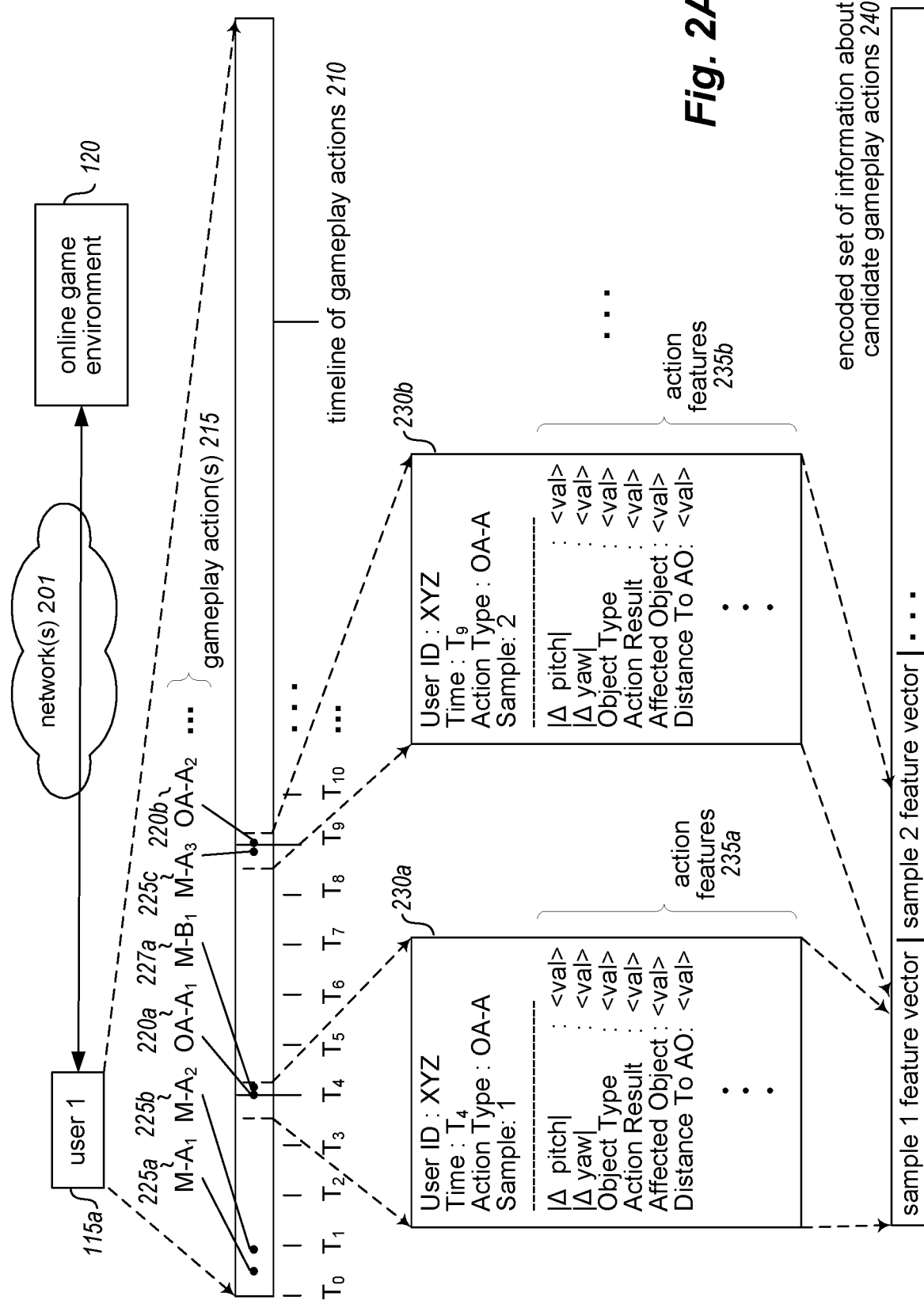
FIGS. 2A-2B illustrate examples of analysis of gameplay actions and corresponding models for use as part of performing at least some of the described techniques.
Figure 2B:
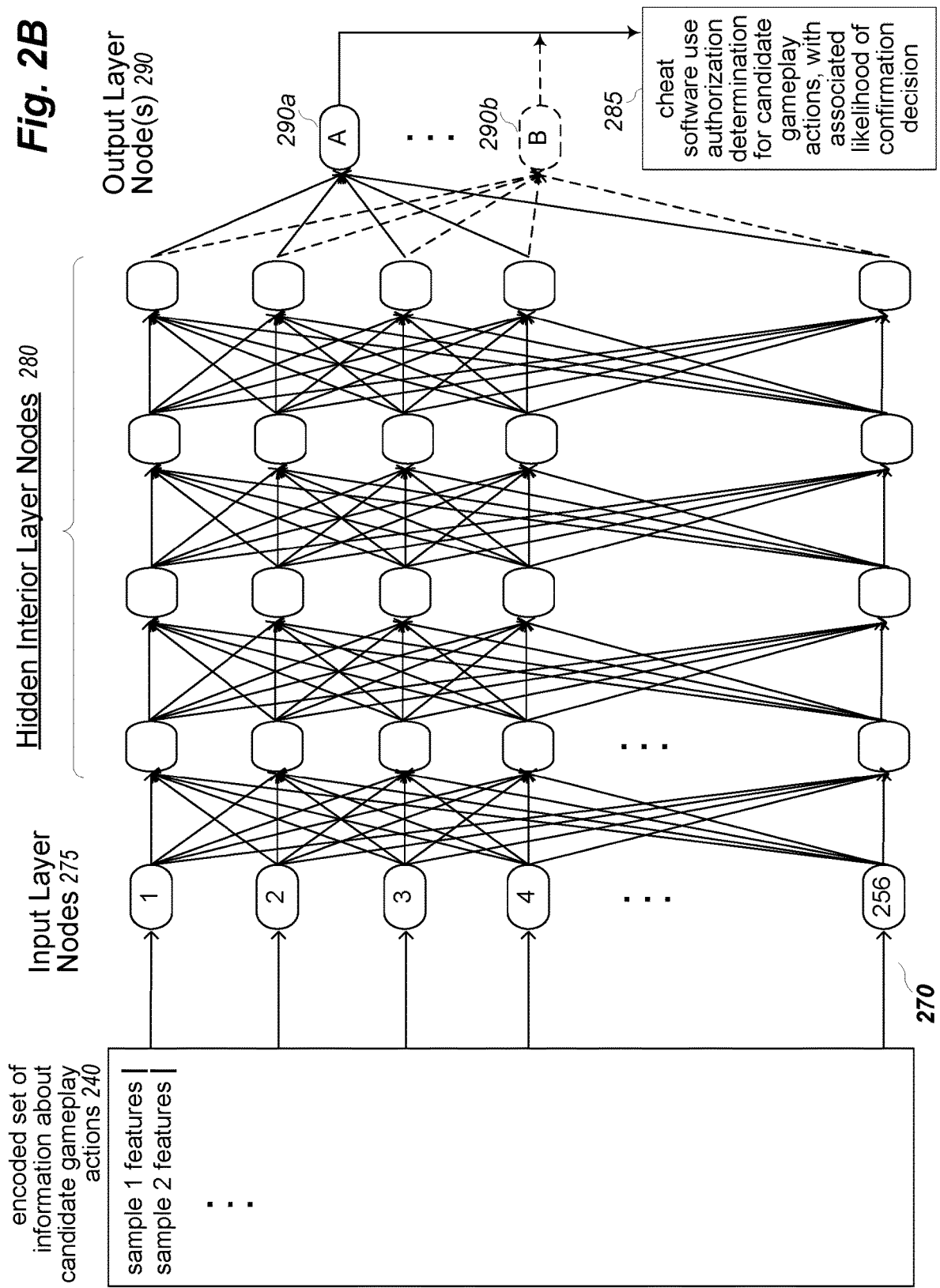

FIGS. 2A-2B illustrate examples of analysis of gameplay actions and corresponding models for use as part of performing at least some of the described techniques. In particular, FIG. 2A continues the example of FIG. 1, and illustrates a particular user 115a (user 1) who is using a client computing device (not shown) to interact with an online game environment 120 provided by one or more server computing systems (not shown) over one or more computer networks 201, including to participate in an interaction session in which the user participates in a variety of gameplay actions 215 at times shown in the example timeline 210.

As one non-exclusive example, the online game environment may involve user 1 competing against other users (not shown) who are simultaneously participating in the online game environment, with the online game environment including a virtual world in which the users may move and interact with each other and with virtual objects in the virtual world. For example, if the online game environment is of the type referred to as a "first person shooter" game, each user may view a portion of the world from that user's virtual perspective (e.g., location and orientation in the virtual world, with the perspective potentially blocked by virtual walls and other virtual objects), and may interact with virtual objects such as weapons and vehicles, including to fire at and potentially other users' virtual avatars (or visual representations) in the virtual world. In such a game environment, user movement activities may include users changing three-dimensional (3D) location and orientation in the virtual world, other user activities may be to select and activate virtual objects such as aiming and firing a virtual weapon or operating a virtual vehicle, other user activities may be to obtain additional information such as activating functionality to see through walls (e.g., an 'x-ray vision' functionality), etc., with associated gameplay actions resulting from some or all such activities. It will be appreciated that other types of online game environments or other execution environments may include other types of user activities and gameplay actions—for example, an online exploration game may include user movements that include teleporting (e.g., through virtual portals) between two non-adjacent locations, but may not include actions to fire or otherwise operate weapons.

In such online game environments, many gameplay actions may be permissible and even necessary to be successful in the execution environment. However, given the competitive nature of many such execution environments, some users may attempt to perform unauthorized actions, such as by executing additional cheat software that is not part of the standard execution environment to provide additional abilities within the virtual world. As one example, if a user is allowed to move only on foot at a maximum specified speed, then unauthorized actions may include using cheat software that provides unauthorized modifications to allow the user to teleport or otherwise move in unauthorized manners (e.g., faster than the maximum speed, through walls or other barriers, etc.). As another example, if a user is allowed to take shots at other users using only specified types of weapons and via manual targeting, then unauthorized actions may include using cheat software that provides other weapons with more advanced capabilities and/or that provides enhanced targeting (e.g., automated target tracking and aiming so that shots do not miss). A variety of other types of unauthorized actions may similarly be provided in such an online game environment and virtual world via use of cheat software, such as obtaining access to restricted information about where other users are located who would not otherwise be visible (e.g., to 'see' through walls or other barriers, to see a map that shows locations of all users, etc.).

In the illustrated example of FIG. 2A, user 1 performs a series of activities that include gameplay movements of a first specified type (actions $M-A_1$ 225a, $M-A_2$ 225b and $M-A_3$ 225c, such as to each include one or more steps forward), gameplay movements of a second specified type (action $M-B_1$ 227a, such as to turn or crouch down or stand up), gameplay virtual object activations of a specified type (actions $OA-A_1$ 220a and $OA-A_2$ 220b, such as to each include firing a weapon), etc. Consider a situation in which a model (not shown) is trained to identify unauthorized actions related to firing weapons via use of cheat software, and in which corresponding types of gameplay actions are extracted from the user interaction session and used as candidate gameplay actions to be evaluated. In this example, the candidate gameplay actions include actions $OA-A_1$ 220a and $OA-A_2$ 220b, which occur at times $T_4$ and $T_9$, respectively, as shown in timeline 210. As previously noted, a variety of associated attributes for each such gameplay action may be useful in assessing whether one or more such gameplay actions are authorized or not—in some embodiments, some or all such attributes may be automatically learned as part of training the model (e.g., by supplying training data that includes values for all available attributes for each gameplay action, and determining which attribute values are correlated with or otherwise affect the resulting classification determinations of the actions being unauthorized or not due to detected use of cheat software or not), while in some embodiments, some or all such attributes may be manually specified as part of the creation and implementation of the GCSD system (e.g., by human representatives of the operator of the GCSD system). The information about the gameplay actions 215 may be acquired in various manners in various embodiments, as discussed in greater detail elsewhere herein—as one non-exclusive example, some or all user interaction sessions may be recorded, and may be subsequently played back in a manner to allow each gameplay action that takes place to be extracted along with associated information.

In the illustrated example of FIG. 2A, information 230 is extracted from user 1's interaction session for each candidate gameplay action of type OA-A, including information 230a for gameplay action $OA-A_1$ and information 230b for gameplay action $OA-A_2$. In this example, the information 230 includes metadata such as the associated time, action type, sample number (with each gameplay action of type OA-A being a separate sample) and user identifier (ID), as well as action features 235 that include values for attributes associated with gameplay action type OA-A and corresponding to the particular candidate gameplay action of that type. The attribute values may correspond at least in part to a time period before and/or after the time of the candidate gameplay action (e.g., 0.5 seconds before, and 0.25 seconds after), and may include values for example attributes such as the following: absolute value of change in pitch of weapon for ½ second before shot and ¼ second after; absolute value of change in yaw of weapon for ½ second before shot and ¼ second after; an indication of the type of weapon used; the result of the shot (e.g., a miss, a successful head shot, a hit of another type, etc.); one or more other affected virtual objects (e.g., other user that is hit); a distance to the one or more other affected virtual objects if a hit occurs; etc. In addition, if one or more other gameplay actions occur in close proximity to a candidate gameplay action of type OA-A, information about such other gameplay actions may be included as part of the attribute values of the candidate gameplay action—for example, user movement action $M-B_1$ occurs within ¼ second after candidate gameplay action $OA-A_1$, and thus may affect corresponding attribute values such as change in pitch and/or yaw for that candidate gameplay action.

After the information 230 is gathered for each candidate gameplay action, one or more sets of further encoded information 240 is constructed about multiple such candidate gameplay actions, by creating and including a vector of attribute values for each candidate gameplay action in the encoded information 240—in the illustrated example, the encoded information 240 includes a sequential set of up to 128 sample candidate gameplay actions that occur during some or all of the interaction session (e.g., for a multi-round game in which success includes being the first to win 9 rounds, an 8-round window may be used). In such an example, each candidate gameplay action may be included in only one set of encoded information in some embodiments, while in other embodiments a candidate gameplay action may be included in multiple such sets of encoded information (e.g., if an 8-round window is used and it is a sliding window, a first set of encoded information may include weapon firings that occur in rounds 1-8, a second set of encoded information may include weapon firings that occur in rounds 2-9, etc.).

FIG. 2B continues the example of FIG. 2A, and illustrates using the encoded set of information 240 about the candidate gameplay actions of user 1 as input to a trained model 270 to obtain an authorization determination 285 based on whether cheat software use is detected, and with an associated likelihood for the candidate gameplay actions. In the illustrated example of FIG. 2B, the trained model is a deep neural network with a 256-wide dense input layer of nodes 275, 4 hidden 256-wide GRUs (gated recurrent layers) with nodes 280, and one or more output layer nodes 290, with a maximum input sequence length of 128, using gradient descent training, a ReLU (REctified Linear Unit) rectifier activation function and binary cross-entropy loss function and a sigmoid output layer. The example deep neural network model 270 provides a mixture of densely connected and recurrent layers, which consumes a sequence of feature vectors such as those in encoded information 240, and outputs a classification of the case corresponding to the expected verdict that would be rendered if the case were adjudicated by one or more other cheat software detection decision systems. In some embodiments, the output classification may be a binary classification ('convicted' as unauthorized, or not, such as may be output as a single floating point number between 0 and 1 that represents an approximate probability of the other cheat software detection decision system(s) deciding that the gameplay actions are unauthorized based on cheat software use detection), while in other embodiments the output classification may be a multi-class classification indicating one of multiple types of unauthorized gameplay actions that are identified (e.g., in the example of the first-person shooter game identifying unauthorized gameplay actions, to classify unauthorized gameplay actions of firing a weapon as one of unauthorized aim assistance or unauthorized tracking of non-visible targets or unauthorized movements to reach firing locations). In addition, other types of model architectures may be used, such as neural networks with convolutional layers (in addition to or instead of dense and recurrent layers), and other types of deep learning that do not use neural networks.

It will be appreciated that the details of FIGS. 2A and 2B are provided for example purposes only, and that various other types of data may be used for training and may be acquired in other manners.

Figure 3:
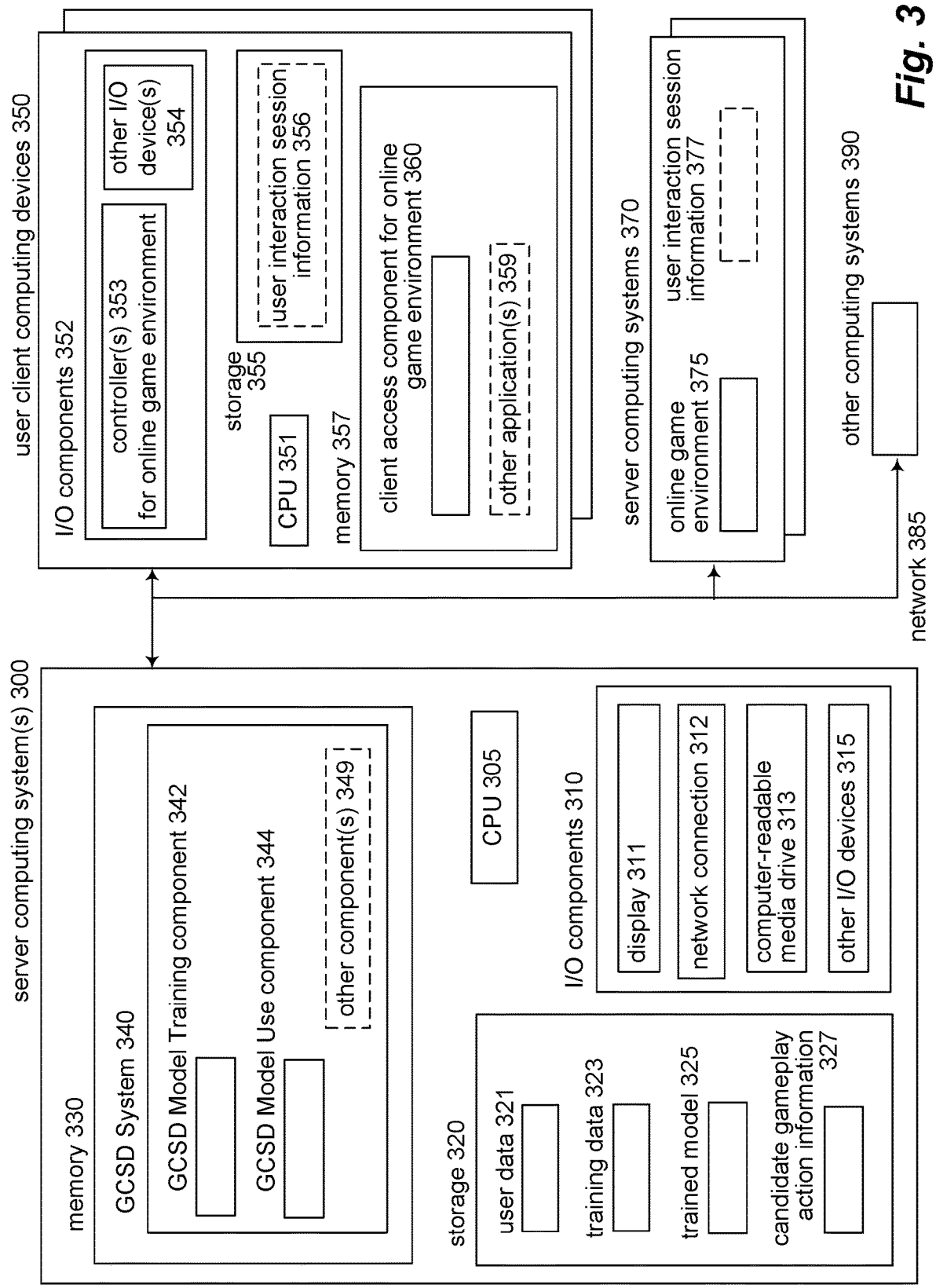
FIG. 3 is a block diagram illustrating example devices and systems for performing at least some of the described techniques.

FIG. 3 is a block diagram illustrating an embodiment of one or more server computing systems 300 that are suitable for performing at least some of the described techniques, such as by executing an embodiment of a GCSD system 340 that performs automated operations to automatically reduce cheating in an online game environment, such as by using deep learning classification to implement cheat software use detection for gameplay actions in such an online game environment. The example server computing system 300 includes one or more hardware central processing unit ("CPU") processors 305, various hardware input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, head-mounted display devices, specialized controllers for particular game environments or systems or for other types of online game environments, etc.)—such I/O components may enable a variety of types of interaction types, including, for example, voice control, gesture control, etc.

One or more client computing devices 350 are similarly illustrated as each having one or more hardware CPU processors 351, one or more hardware I/O components 352 (e.g., one or more specialized controllers 353 for use with online game environments, one or more other I/O devices 354, etc.), memory 357, and storage 355—the other I/O devices 354 may similarly include some or all of the same types of components as illustrated for the server computing system 300, but such components are not illustrated in this example for the sake of brevity. Each such client computing device may be used by one or more associated users (not shown) who interact over one or more networks 385 with one or more online game environments, such as by executing corresponding client software 360 (e.g., provided by an entity operating an online game environment, by an entity executing computing servers and associated software to host one or more such online game environments for other entities who provide them, etc.) in memory 357 and/or other optional applications 359 in memory 357. As the client computing device performs interactions with an online game environment on behalf of one or more users, it may optionally create and store corresponding user interaction session information 356 on storage 355, as well as to in some embodiments store other types of related information that is not shown (e.g., user-specific information, information specific to one or more games or other execution environments, etc.).

One or more other server computing systems 370 are further illustrated that provide one or more online game environments 375 in this illustrated embodiment for use by users of client computing devices 350, although in other embodiments the server computing system(s) 300 may provide both the GCSD system 340 and at least one online game environment. As one or more client computing devices perform interactions with the online game environment 377 on behalf of one or more users, the server computing system(s) 370 may optionally create and store corresponding user interaction session information 377 (e.g., on storage of the server computing system(s) 370, not shown), as well as to in some embodiments store other types of related information that is not shown (e.g., user-specific information, information specific to one or more games or other execution environments, etc.). One or more other computing systems 390 may also optionally perform additional types of functionality, such as to execute software (not shown) to interact with one or more online game environments and/or client computing devices to generate and/or retrieve user interaction session information for use by the GCSD system, to provide one or more other execution environments (not shown) available to at least some users and client computing devices, to provide other types of content and/or functionality (not shown) to at least some users and client computing devices, etc. The other computing systems 370 and 390 may similarly include some or all of the same types of components as the server computing system 300 and/or client computing devices 350, but such components are not illustrated in this example for the sake of brevity. The server computing system 300 and client computing devices 350 (and the GCSD system 340 and components 342, 344 and 349 and software 359 and 360) may also communicate with each other and/or other computing devices and systems in various manners, including via one or more networks 385 (e.g., the Internet, one or more cellular telephone networks, etc.).

In the illustrated embodiment, at least a portion of the GCSD system 340 is executing in memory 330 of the server computing system 300, and in this example includes a GCSD Model Training component 342 (e.g., the component 105 of FIG. 1) and a GCSD Model Use component 344 (e.g., the component 110 of FIG. 1)—one or more other components 349 (e.g., a component to obtain gameplay action information to assess, such as to retrieve information 356 and/or 377 and extract corresponding gameplay action information) and/or other software applications (not shown) may also optionally be executing in the memory 330. Similarly, while not illustrated in this example, in other embodiments, some or all of the GCSD system may optionally execute in the memory 357 of a client computing device and/or memory (not shown) of a server computing system 370, such as to enable the client computing device 350 and/or server computing system 370 to perform all of the described techniques. Additional details are discussed elsewhere herein related to types of automated operations that various of the GCSD system components may perform. The system 340 and/or the system components 342, 344 and 349 may in some embodiments include software instructions that, when executed, program or otherwise configure the processor(s) 305 and the server computing system(s) 300, and/or the processor(s) 351 and the client computing device(s) 350, and/or the server computing system(s) 370 and its processor(s) (not shown), to perform automated operations that implement at least some of the described techniques.

The GCSD system 340 and its components may also obtain and use various information as part of their automated operations, such as user data 321 (e.g., user identity, information about past gameplay actions, a trust score or other assessment of the user, etc.), training data 323 (for use by component 342 in training one or more models), model data 325 for one or more trained models (for use by component 344 in using the train model(s) to detect and stop use of cheat software in an online game environment) and/or to-be-trained models, and candidate gameplay action information 327 to be assessed by component 344 on storage 320 of the server computing system 300—such data and its use may be similar to that described with respect to data 185 of FIG. 1 and/or information 240 of FIG. 2A and/or elsewhere herein.

For example, the GCSD system 340 may obtain various types of user-related information, such as by interacting with corresponding client computing devices 350 and/or server computing systems 370 (e.g., via a corresponding optional component 349 that enables users to register with the system 340 and/or to provide other types of user-specific information), and may store some or all such information in user data 321 on storage 320. While not illustrated here, in other embodiments some or all of the GCSD system 340 may execute on behalf of a single client or a single entity (e.g., an organization with multiple employees or other members). In addition, the GCSD system may further obtain and use additional types of data in at least some embodiments, such as information about particular execution environments from one or more server computing systems 370 and/or other computing systems 390. Such other information may be used in various manners when automatically detecting cheat software use in an interactive execution environment, as discussed elsewhere herein.

It will be appreciated that the illustrated computing systems and devices are merely illustrative and are not intended to limit the scope of the present invention. For example, computing system 300, client computing devices 350, server computing systems 370 and/or other computing systems 390 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 and/or its components may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software components and/or systems may execute in memory on another device and communicate with the illustrated computing systems/devices via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) 305 and/or CPU(s) 351 and/or other processor means, program the processor(s) to automatically perform the described operations for that component/system. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
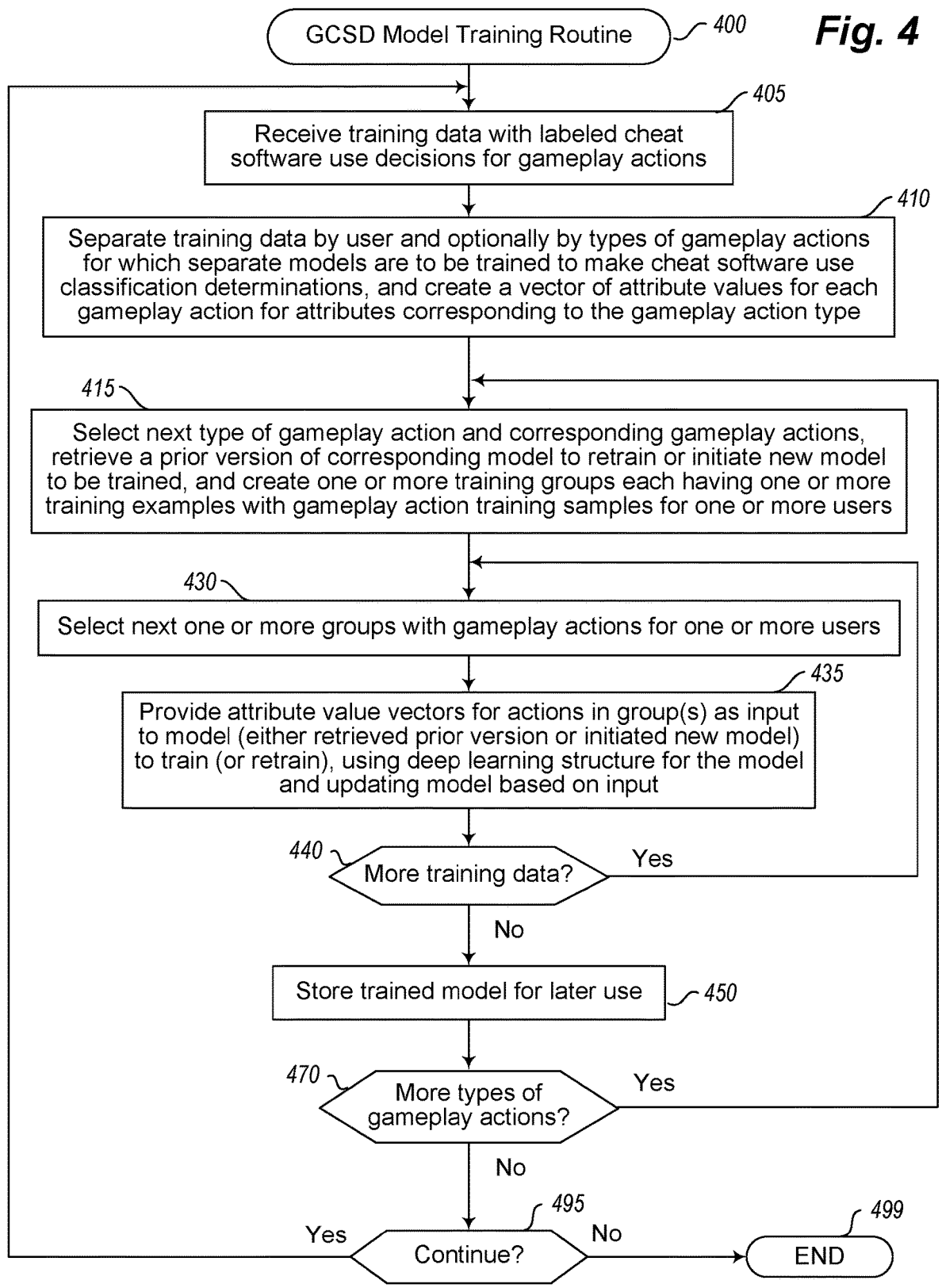
FIG. 4 is a flow diagram of an example embodiment of a GCSD Model Training routine.

FIG. 4 is a flow diagram of an example embodiment of a GCSD Model Training routine 400. The routine 400 may be performed by, for example, the GCSD Model Training component 105 of FIG. 1 and/or the GCSD Model Training component 342 of FIG. 3 and/or a component performing model training operations as discussed with respect to FIGS. 2A-2B and elsewhere herein, such as to receive and use training data about gameplay actions to train one or more models for further use.

While the illustrated embodiment of the routine 400 discusses receiving a group of training data and then using it to train one or more models, before potentially later retraining those models based on additional training data, it will be appreciated that the operations of the routine 400 may be performed in other manners in other embodiments, including to incrementally train (or retrain) a model in a dynamic manner as additional training cases become available. It will also be appreciated that the illustrated embodiment of the routine may be implemented in software and/or hardware as appropriate, and may be performed by, for example, one or more server computing systems that are also operating an online game environment or other interactive execution environment, one or more client computing devices used by users to access an online game environment or other interactive execution environment, one or more computing systems under control of an entity separate from the providers and users of an online game environment or other interactive execution environment (e.g., by an operator of an online environment that executes multiple games for multiple other entities), etc. Furthermore, while a single embodiment of the routine 400 is shown for a corresponding GCSD Model Training component, it will be appreciated that in other embodiments multiple such components and routines may be executing simultaneously, such as for different types of training data (e.g., different users, different types of gameplay actions, etc.) and/or different models.

The illustrated embodiment of the routine 400 begins at block 405, where training data is received that includes one or more gameplay actions and corresponding labeled decisions of whether the gameplay actions (whether individually or as one or more groups) are classified as being unauthorized or not based on cheat software use decisions—as discussed in greater detail elsewhere herein, such training data may be generated by various systems (e.g., by one or more other cheat software detection decision systems that review actual prior gameplay actions and make corresponding decisions) and may include various types of associated information (e.g., a vector of associated attribute values for each gameplay action). In addition, the receiving of the training data may be performed in various manners, such as to be pushed to the routine when the training data becomes available (or at other times as supplied by an operator of the GCSD system), or to be pulled by the routine from other sources (e.g., periodically, when specified criteria are satisfied, etc.).

After block 405, the routine continues to block 410 to separate the training data by user (if data is received for multiple users) and optionally by different types of gameplay actions (if data is received for multiple gameplay action types that have different corresponding trained models), as well as to create a vector of attribute values for each gameplay action (with the attributes optionally varying by type of gameplay action) if that is not already provided in the received training data. The routine then proceed to perform a loop of blocks 415-450 for each trained model corresponding to a different type of gameplay action. In particular, the routine in block 415 selects a next type of gameplay action, beginning with the first (or the only one if separate types of gameplay actions are not used or do not have separate trained models), either retrieves a prior version of the corresponding model to retrain or initiates the creation of a new model to train (e.g., creates a new deep neural network model structure), generates one or more training examples each having one or more training samples of actions of the selected user type for each user (e.g., with an amount of actions in a training example corresponding to a size of the input data expected by the model, such as discussed with respect to FIGS. 2A-2B), and creates one or more training groups each having one or more training examples for one or more users (e.g., a thousand training examples per training group).

After block 415, the routine continues to perform a loop of blocks 430-435 for each training group of gameplay actions for one or more users, by selecting the next one or more training groups of gameplay actions in block 430 (beginning with the first one or more such groups, or with the only group if multiple groups are not created). In block 435, the routine then provides the attribute value vectors for the gameplay actions in the selected one or more groups as input to the model (whether the retrieved prior version to retrain or a new model being trained), with the model structure and/or training methodology using deep learning techniques in at least some embodiments and updating the model based on the input, as discussed elsewhere herein. After block 435, the routine continues to block 440 to determine if there are more groups of gameplay actions for the training data of that type of gameplay action, and if so returns to block 430.

If it is instead determined in block 440 that there is not more training data, the routine continues to block 450 to store the trained model for later use. In some embodiments and situations, a minimum amount of training may be performed before a trained model is put into use—if so, the trained model may be stored with additional associated information that indicates whether or not it is ready for use. In addition, the routine may optionally notify one or more other components or systems in block 450 if the stored model is available for use (e.g., by providing the trained model to them), such as the GCSD Model Use component (as discussed in greater detail with respect to FIG. 5). After block 450, the routine continues to block 470 to determine whether there are more types of gameplay actions with corresponding models to be trained, and if so returns to block 415.

If it is instead determined in block 470 that there are not more types of gameplay actions with corresponding models to be trained, the routine continues instead to block 495 to determine whether to continue, such as until an explicit indication to terminate is received. If it is determined to continue, the routine returns to block 405, and otherwise continues to block 499 and ends.

Figure 5:
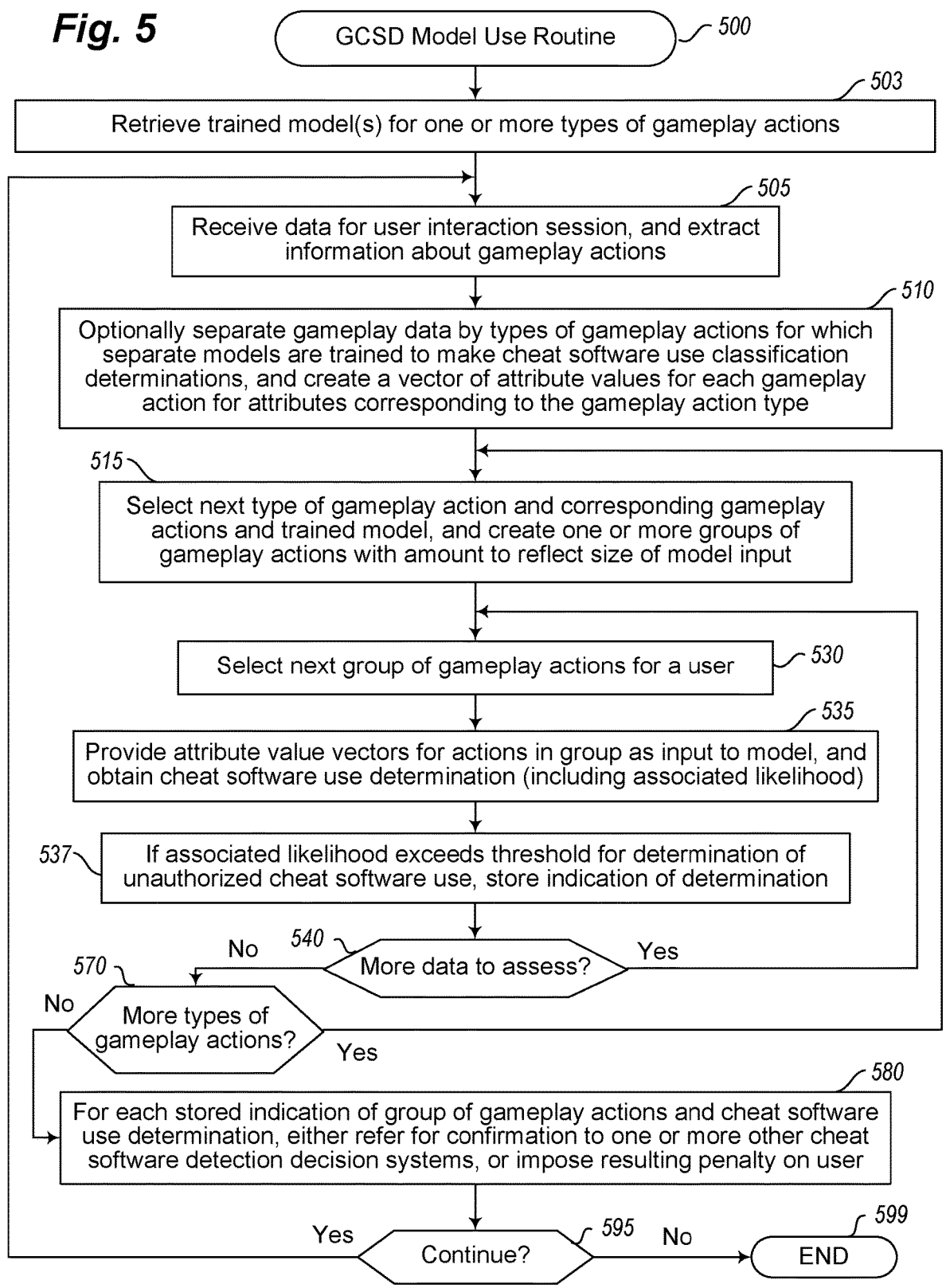
FIG. 5 is a flow diagram of an example embodiment of a GCSD Model Use routine.

FIG. 5 is a flow diagram of an example embodiment of a GCSD Model Use routine 500. The routine 500 may be performed by, for example, the GCSD Model Use component 110 of FIG. 1 and/or the GCSD Model Use component 344 of FIG. 3 and/or a component using a trained model to perform automated operations to detect and stop use of cheat software in one or more online game environments or other interactive execution environments as discussed with respect to FIGS. 2A-2B and elsewhere herein, such as to receive and use a trained model to determine whether gameplay actions are likely to be unauthorized based on cheat software use detection, and to perform various types of further responses if the gameplay actions are not authorized.

While the illustrated embodiment of the routine 500 discusses receiving data about a user interaction session with an online game environment after it has occurred and then assessing gameplay actions that previously occurred during the interaction session, so that previous unauthorized gameplay actions (if any) based on cheat software use may be used to subsequently impose penalties on the user, it will be appreciated that the operations of the routine 500 may be performed in other manners in other embodiments, including to assess gameplay actions as they occur or immediately afterwards (e.g., in a real-time manner) during an interaction session, such as by obtaining information about gameplay actions as they occur from server computing system(s) providing the online game environment and/or from a client computing device in use by the user for the interaction session. It will also be appreciated that the illustrated embodiment of the routine may be implemented in software and/or hardware as appropriate, and may be performed by, for example, one or more server computing systems that are also operating an online game environment or other interactive execution environment, one or more client computing devices used by users to access an online game environment or other interactive execution environment, one or more computing systems under control of an entity separate from the providers and users of an online game environment or other interactive execution environment (e.g., by an operator of an online environment that executes multiple games for multiple other entities), etc. Furthermore, while a single embodiment of the routine 500 is shown for a corresponding GCSD Model Use component, it will be appreciated that in other embodiments multiple such components and routines may be executing simultaneously, such as for different execution environments, interaction sessions, types of data (e.g., different users, different types of gameplay actions, etc.) and/or different models.

The illustrated embodiment of the routine 500 begins at block 503, where one or more trained models are retrieved for use in evaluating one or more corresponding types of gameplay actions, such as for trained models stored in block 450 of FIG. 4. The illustrated embodiment of the routine then proceeds to perform a loop of blocks 505-580 to use the trained models to evaluate gameplay actions and to perform related activities—while not illustrated, the routine may further retrieve and use updated trained models in some embodiments and situations (e.g., periodically, when specified criteria are satisfied, etc.), such as if the trained models in use are subsequently retrained and/or replaced. The retrieving of the trained model(s) may be performed in various manners, such as to be pushed to the routine when the trained model(s) becomes available (e.g., by the routine 400 of FIG. 4) or at other times as supplied by an operator of the GCSD system, or to be pulled by the routine from other sources.

In block 505, the routine receives data from a user interaction session, and extracts information about gameplay actions that occurred during the session—as discussed in greater detail elsewhere, in some embodiments and situations that may include replaying a recorded version of the interaction session to identify gameplay actions and their associated attribute values, while in other embodiments and situations the information about the gameplay actions may be obtained in other manners (e.g., may be supplied to the routine 500 after being extracted or otherwise identified in other manners). In addition, while a single user interaction session is received and evaluated in the illustrated embodiment, gameplay action data may be received and used in other manners in other embodiments (e.g., for one or more gameplay actions that are not part of or are a subset of interaction session, for multiple interaction sessions, etc.). In addition, while a single user's one or more gameplay actions are evaluated together in the illustrated embodiment, gameplay actions of multiple users may be evaluated together in other embodiments (e.g., if the users are part of a team or their actions are otherwise related), and if so the corresponding prior model training may similarly use information together about gameplay actions of multiple such users.

After block 505, the routine continues to block 510 to optionally separate the data by different types of gameplay actions (if data is received for multiple gameplay action types that have different corresponding trained models), as well as to create a vector of attribute values for each gameplay action (with the attributes optionally varying by type of gameplay action) if that is not already provided in the received data. The routine then proceed to perform a loop of blocks 515-540 for each trained model corresponding to a different type of gameplay action. In particular, the routine in block 515 selects a next type of gameplay action, beginning with the first (or the only one if separate types of gameplay actions are not used or do not have separate trained models), and creates one or more groups of actions of the selected user type (e.g., with an amount of actions in a group corresponding to a size of the input data expected by the model, such as discussed with respect to FIGS. 2A-2B).

After block 515, the routine continues to perform a loop of blocks 530-537 for each group of gameplay actions for the user, by selecting the next group of gameplay actions in block 530 (beginning with the first, or with the only group if multiple groups are not created). In block 535, the routine then provides the attribute value vectors for the gameplay actions in the selected group as input to the trained model, to obtain a classification determination of the gameplay actions as unauthorized or not based on cheat software use detection or not, such as with an associated likelihood that one or more other cheat software detection decision systems would make a corresponding decision on cheat software use detection if they assess the gameplay actions, as discussed elsewhere herein. In block 537, if the routine determines that the results of the evaluation are a determination that the gameplay actions are unauthorized based on cheat software use detection with a likelihood that exceeds a defined threshold, the routine stores an indication of the assessment (e.g., the user, gameplay actions, authorization determination based on cheat software use detection, and associated likelihood) for subsequent use in block 580. After block 537, the routine continues to block 540 to determine if there are more groups of gameplay actions for the data of that type of gameplay action, and if so returns to block 530. If it is instead determined in block 540 that there is not more data, the routine continues to block 570 to determine whether there are more types of gameplay actions to be assessed using corresponding trained models, and if so returns to block 515.

If it is instead determined in block 570 that there are not more types of gameplay actions to be assessed using corresponding trained models, the routine continues instead to block 580 to retrieve the stored indications of unauthorized assessments based on cheat software use detection from block 537, and to proceed to take one or more resulting actions. In some embodiments, each such unauthorized assessment may be referred for confirmation to one or more other cheat software detection decision systems, with gameplay actions that are confirmed to be unauthorized due to cheat software use by the other cheat software detection decision system(s) then resulting in corresponding penalties being imposed. In other embodiments, each such unauthorized assessment may be used by the routine to directly impose corresponding penalties on the associated user, whether instead of or independently from referring the unauthorized assessment to the other cheat software detection decision system(s) for confirmation. In yet other embodiments, a determination may be made for each of one or more of such unauthorized assessments of whether to directly impose penalties or not and whether to refer the unauthorized assessment for further confirmation to other cheat software detection decision system(s), such as based at least in part on the associated assessed likelihood for the unauthorized assessment (e.g., if the likelihood exceeds an upper threshold, such as 90%, to directly impose penalties; if the likelihood exceeds a lower threshold, such as 50% or 55% or 60%, to refer the unauthorized assessment for confirmation by other cheat software detection decision system(s); if the likelihood does not exceed the lower threshold, to not take any further action; etc.). In addition, in at least some embodiments, the type of one or more penalties that are imposed (whether directly by the GCSD Model Use component or by another cheat software detection decision system) may vary based on one or more factors, including the associated likelihood (e.g., to impose a first penalty type if the likelihood exceeds the upper threshold, and to impose a second penalty type, whether instead of or in addition to the first penalty type, if the likelihood exceeds another threshold, such as higher than the upper threshold), other information about the user (e.g., a trust score for the user, previous actions of the user, accumulated penalty points or other similar accumulation, an amount of time since a previous penalty, etc.).

After block 580, the routine continues to block 595 to determine whether to continue, such as until an explicit indication to terminate is received. If it is determined to continue, the routine returns to block 505, and otherwise continues to block 599 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. In addition, the sizes and relative positions of elements in the drawings are not necessarily drawn to scale, including the shapes of various elements and angles, with some elements enlarged and positioned to improve drawing legibility, and the particular shapes of at least some elements being selected for ease of recognition without conveying information regarding the actual shape or scale of those elements. In addition, some elements may be omitted for clarity and emphasis. Furthermore, repeated reference numbers in different drawings may signify the same or similar elements.

From the foregoing it will be appreciated that, although specific embodiments have been described herein for purposes of illustration, various modifications may be made without deviating from the spirit and scope of the invention. In addition, while certain aspects of the invention are presented at times in certain claim forms, or may not be embodied in any claims at some times, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:
receiving, by one or more computing systems, training data about a plurality of decisions each specifying whether gameplay actions of a user in an interactive game environment result in access of the user to the interactive game environment being restricted due to use of cheat software to assist the gameplay actions;
training, by the one or more computing systems, and based on the received training data, a deep neural network model for use in future classifying of further gameplay actions in the interactive game environment as resulting or not resulting in access to the interactive game environment being restricted due to use of cheat software to assist the further gameplay actions;
using, by the one or more computing systems, the trained deep neural network model to control use of cheat software in the interactive game environment, including:
determining, by the one or more computing systems, and for each of multiple users interacting with the interactive game environment, that the trained deep neural network model classifies observed gameplay actions of the user in the interactive game environment as unauthorized and resulting in access being restricted of the user to the interactive game environment due to the observed gameplay actions being similar to other user gameplay actions from the received data that were assisted by use of cheat software;
obtaining, by the one or more computing systems, and for each of one or more first users of the multiple users, a verification that the observed gameplay actions of the first user are unauthorized and result in the access being restricted of the first user to the interactive game environment, including interacting with one or more other cheat software detection systems that are separate from the trained deep neural network model and that further assess the observed gameplay actions of the first user; and
restricting, by the one or more computing systems, the access of each of the first users to the interactive game environment; and
updating, by the one or more computing systems, the trained deep neural network model to improve further control of the use of cheat software in the interactive game environment, including:
obtaining, by the one or more computing systems, and for each of one or more second users of the multiple users that are separate from the first users, a verification that the observed gameplay actions of the second user are not unauthorized and do not result in the access being restricted of the second user to the interactive game environment, including interacting with the one or more other cheat software detection systems that further assess the observed gameplay actions of the second user; and
updating, by the one or more computing systems, the trained deep neural network model to reflect that, for each of the second users, the observed gameplay actions of the second user are not unauthorized and do not result in the access being restricted of the second user to the interactive game environment.

2. The computer-implemented method of claim 1 wherein the receiving of the training data includes obtaining information from the one or more other cheat software detection systems about prior decisions made for a plurality of prior gameplay actions of other users in the interactive game environment that specify whether the plurality of prior gameplay actions previously resulted in the access being restricted of the other users to the interactive game environment, and wherein the determining for each of the multiple users includes using the trained deep neural network model to determine a likelihood that the observed gameplay actions of the user will result in the access being restricted of the user to the interactive game environment, and identifying the determined likelihood as exceeding a defined threshold for unauthorized gameplay actions.

3. A non-transitory computer-readable medium with stored contents that cause a computing system to perform automated operations including at least:
determining, by the computing system, that observed actions of a user in an interactive execution environment will result in access of the user to the interactive execution environment being restricted due to being similar to other unauthorized actions, wherein the determining includes using a model trained to classify user actions in the interactive execution environment as being unauthorized and resulting in access to the interactive execution environment being restricted if a review of the user actions by one or more other unauthorized software detection systems would determine that the user actions are assisted by use of unauthorized software;

obtaining, by the computing system and based at least in part on the determining, a decision of whether the observed actions of the user are unauthorized and result in the access of the user to the interactive execution environment being restricted due to being assisted by the use of the unauthorized software, including interacting with the one or more other unauthorized software detection systems that further assess the observed actions;

storing, by the computing system, information about the determining that the observed actions of the user in the interactive execution environment will result in the access of the user to the interactive execution environment being restricted due to being similar to other unauthorized actions; and using, by the computing system, the obtained decision to further control access to the interactive execution environment, including restricting the access of the user to the interactive execution environment if the obtained decision indicates that the observed actions are unauthorized, and otherwise updating the trained model to reflect that the observed actions of the user are not unauthorized.

4. The non-transitory computer-readable medium of claim 3 wherein the obtained decision indicates that the observed actions are unauthorized, and wherein the using of the obtained decision to further control access to the interactive execution environment includes banning the user from accessing the interactive execution environment.

5. The non-transitory computer-readable medium of claim 3 wherein the obtained decision indicates that the observed actions are unauthorized, and wherein the using of the obtained decision to further control access to the interactive execution environment includes suspending the user from use of the interactive execution environment for at least one of a defined period of time or until one or more specified criteria are satisfied.

6. The non-transitory computer-readable medium of claim 3 wherein the obtained decision indicates that the observed actions are unauthorized, and wherein the using of the obtained decision to further control access to the interactive execution environment includes reducing a trust score assigned to the user that affects how the interactive execution environment provides functionality to the user.

7. The non-transitory computer-readable medium of claim 3 wherein the obtained decision indicates that the observed actions are unauthorized, and wherein the using of the obtained decision to further control access to the interactive execution environment includes adding one or more penalty indications to an accumulation for the user that results in other restrictions on the user when the accumulation reaches a specified threshold.

8. The non-transitory computer-readable medium of claim 3 wherein the interactive execution environment is an online game environment, wherein the observed actions of the user are gameplay actions, wherein the unauthorized software is cheat software executed on a client computing device of the user, and wherein the restricting of the access includes blocking use by the user of the online game environment for at least a specified amount of time.

9. The non-transitory computer-readable medium of claim 3 wherein the stored contents include software instructions that, when executed, further cause the computing system to train, before the determining, the model for use in future classifying of user actions in the interactive execution environment as being assisted by unauthorized software use or not being assisted by unauthorized software use, including obtaining and using training data about a plurality of decisions each specifying whether indicated user actions in the interactive execution environment result in access being restricted to the interactive execution environment due to use of unauthorized software to assist the user actions.

10. The non-transitory computer-readable medium of claim 9 wherein the model is a deep neural network that includes multiple hidden layers, and wherein training of the model includes using the multiple hidden layers to identify patterns in attribute values associated with user actions and resulting decisions of whether the user actions are assisted by use of unauthorized software or not assisted by use of unauthorized software.

11. The non-transitory computer-readable medium of claim 9 wherein training of the model includes using deep learning techniques to identify patterns in attribute values associated with user actions and resulting decisions of whether the user actions are assisted by use of unauthorized software or not assisted by use of unauthorized software.

12. The non-transitory computer-readable medium of claim 3 wherein the determining includes, before the interacting with the one or more other unauthorized software detection systems, using the trained model to determine a likelihood that the one or more other unauthorized software detection systems will decide that the observed actions of the user are assisted by the use of the unauthorized software, and identifying the determined likelihood as exceeding a defined threshold for unauthorized user actions.

13. The non-transitory computer-readable medium of claim 12 wherein the stored contents include software instructions that, when executed, further cause one or more computing systems to perform operations of at least one of the one or more other unauthorized software detection systems, including obtaining input from multiple other users of the interactive execution environment about wherein the observed actions of the user are assisted by the use of the unauthorized software.

14. The non-transitory computer-readable medium of claim 12 wherein the stored contents include software instructions that, when executed, further cause a client computing device of the user to perform operations of at least one of the one or more other unauthorized software detection systems by examining at least one of memory on the client computing device or storage on the client computing device for one or more known unauthorized software programs.

15. A system, comprising:
one or more hardware processors of one or more computing systems; and
one or more memories with stored instructions that, when executed by at least one of the one or more hardware processors, cause the system to perform automated operations for a model use component that include at least:
determining that observed gameplay actions of a user in an interactive game environment are unauthorized due to being similar to other gameplay actions that are assisted by use of cheat software, wherein the determining includes using a model trained to classify user gameplay actions in the interactive game environment as being assisted by use of cheat software or not assisted by use of cheat software;

obtaining, based at least in part on the determining, and from one or more other cheat software detection systems that further assess the observed gameplay actions, a decision that the observed gameplay actions of the user are unauthorized due to being assisted by the use of cheat software; and providing information about at least one of the determining that the observed gameplay actions of the user in the interactive game environment are unauthorized or the decision that the observed gameplay actions of the user are unauthorized, wherein the model is a trained deep neural network that indicates additional observed gameplay actions of a second user in the interactive game environment are unauthorized due to being similar to other gameplay actions that are assisted by use of cheat software, and wherein the stored instructions further cause the system to perform additional operations for a model training component that include at least, in response to a second obtained decision from the one or more other cheat software detection systems that the additional observed gameplay actions of the second user are not being assisted by the use of cheat software, updating the trained deep neural network to reflect that the additional observed gameplay actions of the second user are not being assisted by the use of cheat software.

16. The system of claim 15 wherein the stored instructions further cause the system to use the obtained decision to restrict access of the user to the interactive game environment.

17. The system of claim 16 wherein using of the obtained decision to restrict access of the user to the interactive game environment includes preventing the access of the user to the interactive game environment for at least one of a defined period of time or until one or more specified criteria are satisfied.

18. The system of claim 15 wherein the model is further trained to classify the user gameplay actions in the interactive game environment as belonging to one of a plurality of types of unauthorized user gameplay actions, and wherein the determining that the observed gameplay actions of the user in the interactive game environment are unauthorized includes identifying one of the plurality of types of unauthorized user gameplay actions to which the observed gameplay actions of the user belong.

19. The system of claim 15 wherein the model is further trained to classify the user gameplay actions in the interactive game environment as being assisted by use of one of a plurality of types of cheat software, and wherein the determining that the observed gameplay actions of the user in the interactive game environment are unauthorized includes identifying one of the plurality of types of cheat software used to assist the observed gameplay actions of the user.

* * * * *